(12) United States Patent
Campbell et al.

(10) Patent No.: US 7,299,486 B1
(45) Date of Patent: Nov. 20, 2007

(54) CONTROL PROGRAM, FOR A SUPERVISOR PROCESSOR IN A VIDEO-ON-DEMAND SYSTEM, WHICH BUILDS SUBGROUPS OF INTERNET PROTOCOL HEADERS AND TRANSMISSION CONTROL LISTS

(75) Inventors: Kent M. Campbell, Salt Lake City, UT (US); Robert Louis Jacobs, Sandy, UT (US); John Waldimars Ulis, Sandy, UT (US); Stephen Ralph Bates, Salt Lake City, UT (US); Thomas Charles Harsch, Salt Lake City, UT (US)

(73) Assignee: Unisys Corporation, Blue Bell, PA (US)

( * ) Notice: Subject to any disclaimer, the term of this patent is extended or adjusted under 35 U.S.C. 154(b) by 1604 days.

(21) Appl. No.: 10/010,899

(22) Filed: Dec. 4, 2001

(51) Int. Cl.
*H04N 7/173* (2006.01)

(52) U.S. Cl. .............................. 725/93; 725/87; 725/91; 725/92; 725/94; 725/95; 725/96; 725/97; 725/98; 725/114; 725/115; 725/116; 725/117; 725/138; 370/229; 370/230; 370/235; 370/351; 370/352; 370/353; 370/354; 370/355; 370/356; 370/357; 709/213; 709/214; 709/215; 709/216; 709/230; 709/231; 709/232; 709/233; 709/234; 709/235; 709/236

(58) Field of Classification Search .................. 725/87, 725/91–97, 98, 114–117, 138, 144–147; 370/229–230, 370/235, 351–357; 709/213–216, 230–236
See application file for complete search history.

(56) References Cited

U.S. PATENT DOCUMENTS

| | | | | |
|---|---|---|---|---|
| 5,687,275 A * | 11/1997 | Lane et al. | .................... | 386/68 |
| 5,864,557 A * | 1/1999 | Lyons | ......................... | 370/444 |
| 6,167,445 A * | 12/2000 | Gai et al. | .................... | 709/223 |
| 6,381,746 B1 * | 4/2002 | Urry | ........................... | 725/87 |
| 6,760,917 B2 * | 7/2004 | De Vos et al. | ................ | 725/94 |

* cited by examiner

*Primary Examiner*—Jason Salce
(74) *Attorney, Agent, or Firm*—Charles A. Johnson; Robert Marley; Charles Fassbender

(57) ABSTRACT

A control program for a supervisor processor in a video-on-demand system directs the supervisor processor to perform the steps of: a) transfer a group of video data packets, from an externally stored complete video into a memory for the supervisor processor; b) build in the supervisor processor's memory, a respective subgroup of internet protocol headers for each video data packet in the group; and c) construct, in the memory of a co-processor, a transmission control list which indicates how each video data packet in the group, and its respective subgroup of internet protocol headers, can be accessed from the supervisor processor's memory by the co-processor.

11 Claims, 10 Drawing Sheets

*FIG. 6 (CO-P)*

FIG. 8 (HOST P.)

CONTROL PROGRAM, FOR A SUPERVISOR PROCESSOR IN A VIDEO-ON-DEMAND SYSTEM, WHICH BUILDS SUBGROUPS OF INTERNET PROTOCOL HEADERS AND TRANSMISSION CONTROL LISTS

RELATED CASES

The present invention, as identified by the above docket number and title, is related to two other inventions, which are described herein with one common Detailed Description. These two related inventions are entitled "VIDEO-ON-DEMAND SYSTEM WHICH BUILDS TRANSMISSION CONTROL LISTS AND USES SUCH LISTS TO SEND VIDEO DATA PACKETS WITH RESPECTIVE SUBGROUPS OF INTERNET PROTOCOL HEADERS", having U.S. Ser. No. 10/010,909; entitled "CONTROL PROGRAM, FOR A CO-PROCESSOR IN A VIDEO-ON-DEMAND SYSTEM, WHICH USES TRANSMISSION CONTROL LISTS TO SEND VIDEO DATA PACKETS WITH RESPECTIVE SUBGROUPS OF INTERNET PROTOCOL HEADERS", having U.S. Ser. No. 10/010,923. Patent applications on all three inventions were filed concurrently in the U.S. Patent Office on Dec. 4, 2001.

BACKGROUND OF THE INVENTION

This invention relates to video-on-demand systems which send multiple streams of video data to respective viewers. In the prior art, one such video-on-demand system is described in U.S. patent application Ser. No. 09/318,987 by Urry which is entitled "Scaleable Video System Having Shared Control Circuits For Sending Multiple Video Streams To Respective Sets of Viewers" (hereafter the Urry video-on-demand system).

Included in the Urry video-on-demand system are the following components: a) a single supervisor processor, and multiple co-processors which are selectable in number and are coupled via a bus to the single supervisor processor; b) a supervisor memory which is coupled to the supervisor processor and which stores a respective portion of each of several video streams; c) a control program for each co-processor which selectively reads the stored video stream portions from the supervisor memory and sends each video stream portion that is read to a different viewer; and d) a control program for the single supervisor processor, which dynamically updates the stored portion of each video stream in the supervisor memory and which services external requests to change the respective viewers of each video stream.

One particular feature of the Urry video-on-demand system is that it is highly scaleable and economical. This feature is achieved because the number of co-processors is selectable; the number of video streams which are sent by each co-processor is selectable; and, the number of viewers per steam is selectable. By making these selections, the Urry video-on-demand system can be increased or decreased in size to meet the different requirements of many customers. Further, since the Urry video-on-demand system includes only a single supervisor processor and a single supervisor memory which operate in a shared fashion with all of the co-processors, the cost of those items is incurred only once.

However, a drawback of the Urry video-on-demand system is that to receive and show a video at the display device of any one viewer, that display device must be coupled to a transmission network thru a particular type of set-top box which has an ATM interface (asynchronous transfer mode interface) to the network. This is evident from Urry's FIG. 4 which shows that each video stream to the transmission network is sent during a series a spaced-apart time slots, with "K" bytes of video data and a network address of the viewer being sent in each time slot. A video stream with such a transmission format can only be received by a set-top box which has an ATM input interface. However, several other types of set-top boxes do exist; and a potential viewer who would like to connect to the Urry video-on-demand system might have one of those other types of set-top boxes. For example, one other type of set-top box has an "ethernet" interface to a transmission network; another type of set-top box has a "DSL" interface to a transmission network; and still another type of set-top box has a "fiber channel" interface to a transmission network.

Also, another drawback of the Urry video-on-demand system is that the transmission network, which carries the video streams from the output of the co-processors to all of the set-top boxes, must be an ATM switching network. This is because only an ATM switching network is designed to carry video streams with the above described format that is generated by Urry's FIG. 4. However, in certain locations where a potential viewer would like to connect to the Urry video-on-demand system, an ATM switching network may not be available.

Accordingly, a primary object of the present invention is to provide an improved video-on-demand system which avoids both of the above drawbacks.

BRIEF SUMMARY OF THE INVENTION

The present invention, as claimed, is a control program for a supervisor processor in a video-on-demand system. This control program is embodied in a program storage device that is readable by the supervisor processor, and it directs the supervisor processor to perform the steps of: a) transfer a group of video data packets, from an externally stored complete video into a memory for the supervisor processor; b) build, in the supervisor processor's memory, a respective subgroup of internet protocol headers for each video data packet in the group; and, c) construct, in the memory of a co-processor, a transmission control list which indicates how each video data packet in the group, and its respective subgroup of internet protocol headers, can be accessed from the supervisor processor's memory by the co-processor.

The above supervisor control program has use in a video-on-demand system in which the supervisor processor is coupled to the co-processor via a bus; and, the supervisor processor and the co-processor each have a respective memory. In such a system, the supervisor processor performs the above steps a), b) and c); and the co-processor a) partitions into pieces, each video data packet and its respective subgroup of internet protocol headers as identified by the transmission control list, and b) sends the partitioned pieces to an output port, during spaced apart time slots, with an additional header attached to each piece. In one embodiment the additional header is an ATM header.

A major feature of the above video-on-demand system is the ease with which the system can be connected to by any potential viewer. This ease in connectivity is achieved by coupling the output port of the co-processor to the internet thru an internet router which has an ATM input interface, and coupling the display device of each viewer to the internet thru a respective set-top box. Each set-top box can have any type of interface to the internet. For example, one set-top box can have a DSL interface; another set-top box can have an ethernet interface; another set-top box can have a fiber channel interface, and another set-top box can have an ATM interface. These different types of set-top boxes will all work because the internet router with its ATM interface will strip off the ATM header that it receives with each partitioned piece from the co-processor, and will use the respective subgroups of internet protocol headers to deliver the corresponding video data packets to the set-top boxes.

DETAILED DESCRIPTION

Figure 1:
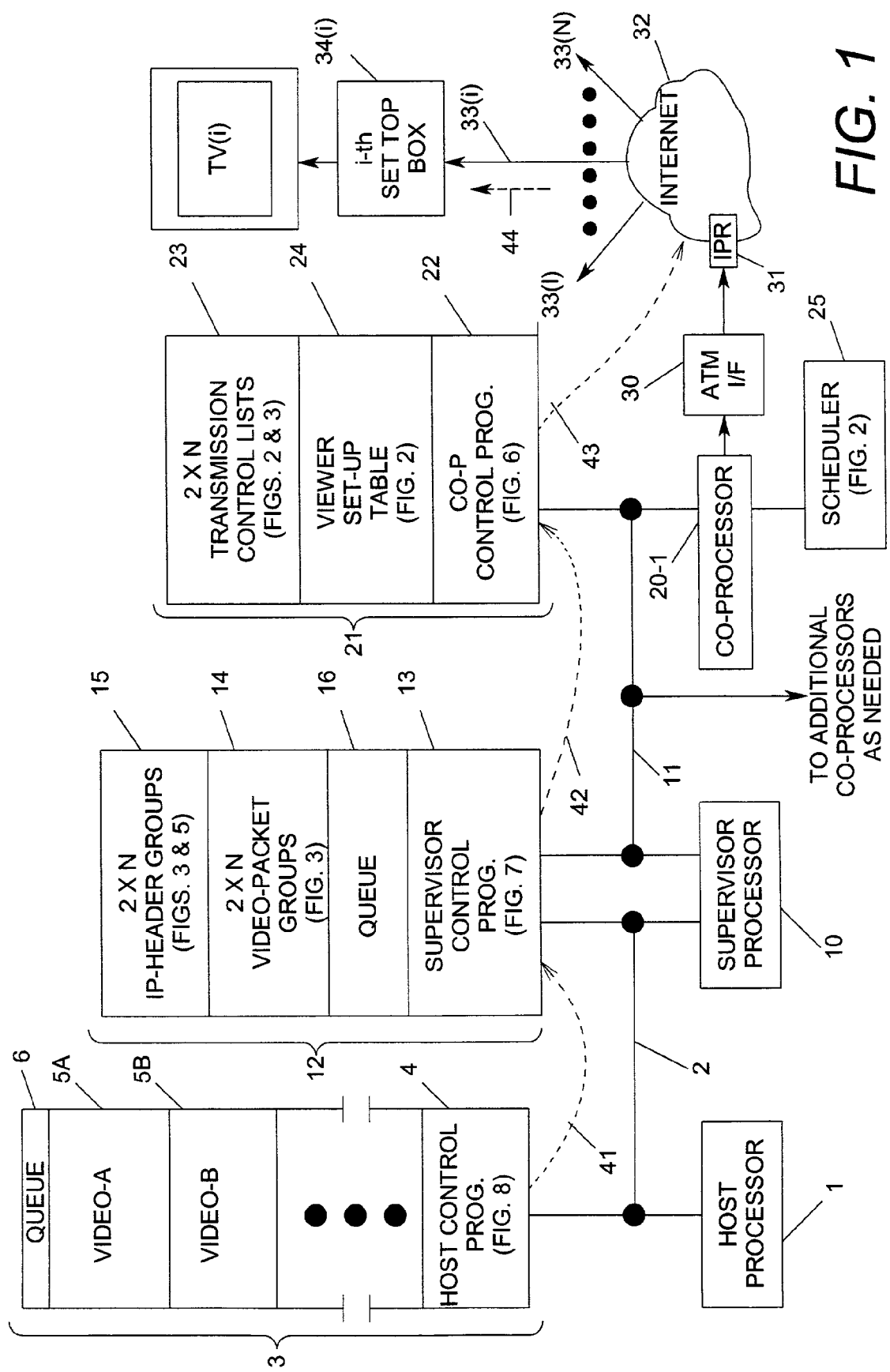
FIG. 1 shows an overview of a video-on-demand system that is one preferred embodiment of the present invention.

With reference now to FIGS. 1-8, one preferred embodiment of the present invention will be described. Beginning with FIG. 1, it shows a video-on-demand system which includes a host processor 1, a supervisor processor 10, and a selectable number of co-processors. Only one co-processor 20-1 is shown in FIG. 1 as an example. The host processor 1 is coupled to the supervisor processor 10 by a time-shared bus 2, and the supervisor processor 10 is coupled to each co-processor by another time-shared bus 11.

Coupled to the host processor 1, via the bus 2, is a digital random access memory 3; and stored within that memory 3 are several items 4, 5A, 5B, and 6. Item 4 is a control program for the host processor 1. This control program 4 directs the host processor 1 to perform various steps that will be described in detail later in conjunction with FIG. 8.

Item 5A is one complete video (called video-A) which any viewer V(i) can request to see on his display device TV(i). Item 5B is another complete video (called video-B) that can be requested by any viewer V(i). Additional complete videos, that can be requested by any viewer, may also be stored within the memory 3; and this is indicated by the three dots after video-B.

Item 6 is a queue that is used by the host processor 1 to receive various requests from any viewer V(i) and from the supervisor processor 10. The requests from a viewer include a request to start being sent a particular video, and a request to stop being sent that same video. Each of these requests is processed by the host control program 4.

Coupled to the supervisor processor 10, via the bus 2 and the bus 11, is a digital random access memory 12; and stored with that memory 12 are several items 13, 14, 15 and 16. Item 13 is a control program which directs the supervisor processor 10 to perform various steps that will be described in detail later in conjunction with FIG. 7.

Item 14 is a two-by-N set of video packet groups. Here, N is the total number of display devices to which the videos 5A, 5B, etc. are being sent. Two groups of video packets are provided in the set 14 for each display device. The two video packet groups for the i-th display device TV(i) are herein called VPG(iA) and VPG(iB). The number of video packets in each group is a selectable variable that ranges from forty to four-hundred.

Item 15 is a two-by-N set of internet protocol header groups. One group of internet protocol headers is provided in the set 15 for each group of video packets in the set 14. The group of internet protocol headers which is provided for the video packet group VPG(iA) is herein called IPHG(iA). Similarly, the group of internet protocol headers which is provided for the video packet group VPG(iB) is herein called IPHG(iB).

Also, for each video packet in any one particular group, the corresponding group of internet protocol headers includes a respective subgroup of the internet protocol headers. The first video packet in the video packet group VPG(iA) is herein called VP(iA)-1; and, the respective subgroup of internet protocol headers for that first video packet is herein called IPHSG(iA)-1. Similarly, the second video packet is the video packet group VPG(iA) is herein called VP(iA)-2; and, the respective subgroup of internet protocol headers for that second video packet is herein called IPHSG(iA)-2.

Item 16 is a queue that is used by the supervisor processor 10 to receive messages from the host processor 1, and the co-processor 20-1. Each received message is processed by the supervisor control program 13.

Coupled to the co-processor 20-1, via the bus 11, is a digital random access memory 21; and stored within that memory 21 are items 22, 23 and 24. Item 22 is a control program for the compressor 20-1. This control program 22 directs the co-processor 20-1 to perform various steps which will be described in detail later in conjunction with FIG. 6.

Item 23 is a two-by-N set of transmissions control lists. One transmission control list is provided in the set 23 for each group of video packets in the set 14. The transmission control list which is provided for the video packet group VPG(iA) is herein called TCL(iA). Likewise, the transmission control list which is provided for the video packet group VPG(iB) is herein called TCL(iB).

Figure 2:
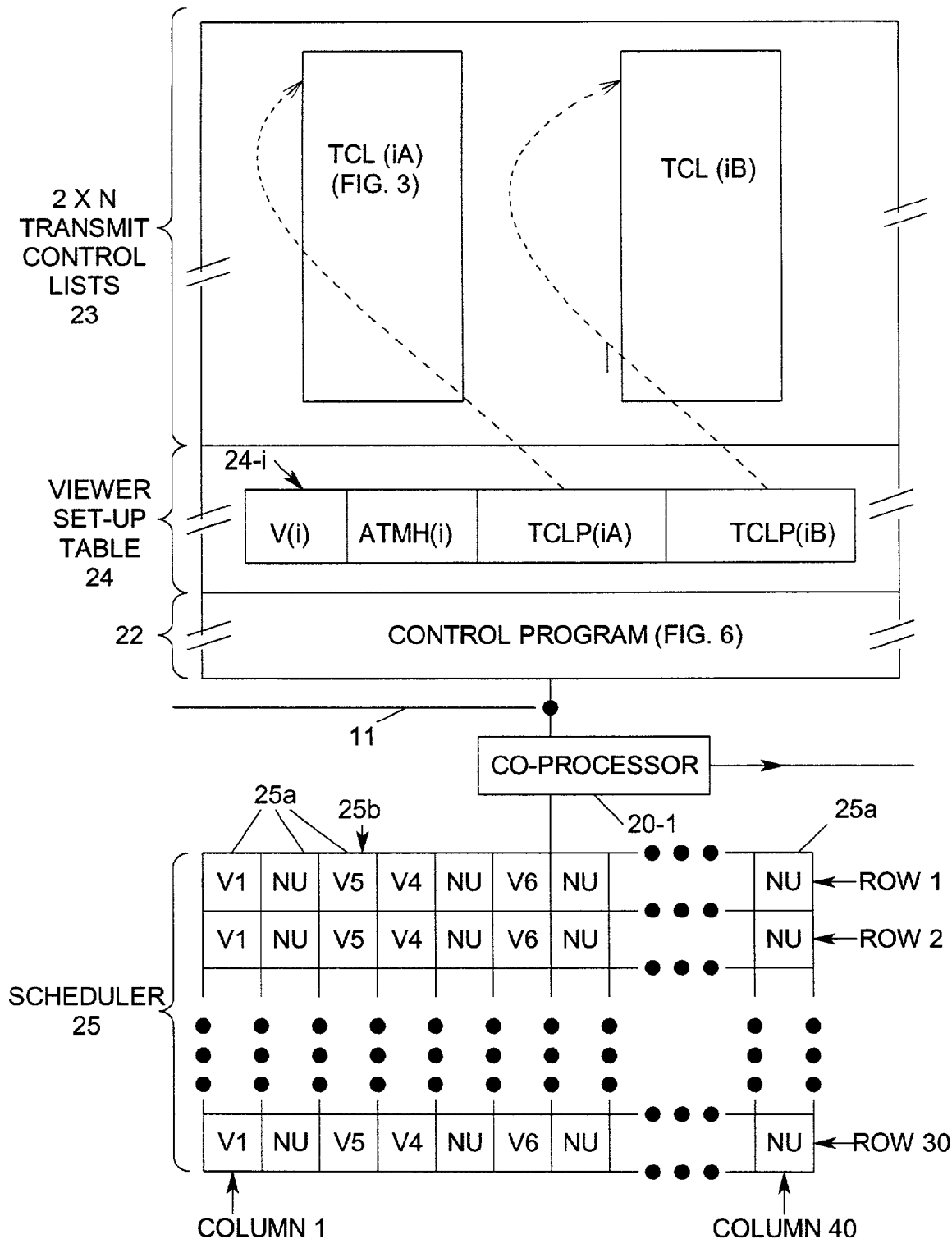
FIG. 2 shows additional details of a co-processor, a scheduler, and a co-processor memory that are in the FIG. 1 video-on-demand system.

Item 24 is a viewer set-up table. In this table 24, a separate row is provided for each display device to which one of the videos 5A, 5B, etc. is being sent. Thus, the viewer set-up table has a total of N rows. The details of the i-th row in table 24 are shown in FIG. 2.

Also, coupled to the co-processor 20-1 is a scheduler 25. This scheduler 25 assigns a series of spaced-apart time periods to each display device that is being sent one of the videos 5A, 5B, etc. Additional details of the scheduler 25 are shown in FIG. 2.

Further, coupled to an output port on the co-processor 20-1 are items 30, 31, 32, 33(*l*)-33(N), 34(*i*), and TV(i). Item 30 is an asynchronous transfer mode (ATM) interface. Item 31 is an internet router which has an ATM internet interface. Item 32 is the internet. Each of the items 33(*l*)-33(N) is an output port from the internet 32 to which a set-top box can be connected. Item 34(*i*) is the i-th set top-box which is connected to the internet output port 33(*i*). Item TV(i) is the i-th display device which is connected to the i-th set top-box 34(*i*).

An overview of how all of the above identified components, in the FIG. 1 video-on-demand system, interact is as follows. Initially, a person who wants to see a particular video at the i-th display device TV(i) sends a request for that video to the host processor 1. This request can be sent by any means, such as a telephone (not shown) for example.

In response to the above request, the host processor 1 sends an "add viewer request" to one of the queues 16 for supervisor processor 10. This request identifies—a) the starting address in the memory 3 of the first two groups of video packets in the requested video; b) the number of bytes in each video packet group; and c) certain routing information that is needed to send the requested video from the output port of the co-processor 20-1, thru the internet router 31 and thru the internet 32 to one particular set-top box 34(*i*).

Thereafter, in response to the add viewer request in the queue 16, the supervisor processor 10 performs the following tasks. First, the supervisor processor 10 uses the starting addresses that it received from the host processor 1 to read the first two video packet groups into item 14 of the memory 12. The reading of these video packet groups is indicated in FIG. 1 by the dashed arrow 41.

Next, the supervisor processor 10 uses the routing information that it received from the host processor 1 to build a corresponding group of internet protocol headers for each group of video packets that it read. These two groups of internet protocol headers are stored in item 15 of the memory 12.

Next, the supervisor processor 10 constructs a respective transmission control list for each of the two groups of video packets that it read. These two transmission control lists are stored in item 23 of the memory 21.

Lastly, the supervisor processor 10 adds a row for the set-top box 34(*i*) into the viewer set-up table 24, and it identifies the set-top box 34(*i*) to the scheduler 25.

Once the set-top box 34(*i*) is identified to the scheduler 25, that scheduler assigns a series of spaced-apart time periods to the set-top box 34(*i*). In each such time period, the co-processor 20-1 uses the transmission control lists to read and partition a piece of a video data packet and its respective subgroup of internet protocol headers for transmission to the set-top box 34(*i*). This reading and partitioning is indicated in FIG. 1 by the dashed arrow 42.

To each partitioned piece of the video data packet and its respective subgroup of internet protocol headers, the co-processor 20-1 adds an ATM header; and the result is sent by the co-processor 20-1 to the internet router 31. This sending is indicated in FIG. 1 by the dashed arrow 43. Then in the internet router 31, the ATM header is stripped away and the subgroup of internet protocol headers is used to transmit the video data packet thru the internet 32 to the set-top box 34(*i*). This transmission is indicated in FIG. 1 by the dashed arrow 44.

In the video-on-demand system of FIG. 1, each set-top box 34(*i*) can have any type of interface to the internet 32. For example, one set-top box can have a DSL interface; another set-top box can have an Ethernet interface; another set-top box can have a fiber channel interface, and another set-top box can have an ATM interface. These different types of set-top boxes will all work because the internet router 31 with its ATM interface will strip off each ATM header that it receives from the co-processor 20-1 and will use the respective subgroups of internet protocol headers to deliver the corresponding video data packets to the set-top boxes.

Also, by partitioning the video data packets with their respective internet protocol headers into pieces, and sending each piece with an ATM header in spaced apart time slots to the internet router 31, the rate at which the video data packets are sent thru the internet 32 is precisely timed. This timing insures that any buffers for the video data in the set-top boxes 34(*i*) do not overflow or underflow.

Turning now to FIG. 2, additional details on the transmission control lists 23, and the viewer set-up table 24, will be described. In FIG. 2, item 24-*i* illustrates the internal structure of the i-th row of the viewer set-up table 24. Each of the N rows in the viewer set-up table 2 have a similar structure.

Included in the i-th row 24-*i* is an internal reference number V(i) for the i-th viewer, an asynchronous transfer made header ATMH(i) for the i-th viewer, and a pair of transmissions control list pointers TCLP(iA) and TCLP(iB). Pointer TCLP(iA) holds the address of the transmissions control list TCL(iA) in the co-processor's memory 21, and pointer TCLP(iB) holds the address of the transmission control list TCL(iB) in the co-processor's memory 21.

Initially, the co-processor 20-1 uses pointer TCLP(iA) as the "current" pointer for the viewer V(i). The current pointer, together with the corresponding transmission control list, identify the video data packets and respective subgroups of internal protocol headers which the co-processor 20-1 is currently sending to the set-top box 34(*i*). Pointer TCLP(iA) continues to be the current pointer until all video data packets that are identified by the transmission control list TCL(iA) have been sent. Then, pointer TCLP(iB) becomes the current pointer.

The above alternating use of pointer TCLP (iA) and pointer TCLP (iB) as the current pointer continues over and over in a repetitive sequence. Also, while pointer TCLP(iB) is the current pointer, the transmission control list TCL(iA) is updated by the supervisor processor 10*a*. Similarly, while pointer TCLA(iA) is the current pointer, the transmission control list (TCL(iB) is updated by the supervisor processor 10.

Also shown in FIG. 2 are additional details on the structure of the scheduler 25. This scheduler 25 is comprised of an array of storage cells 25*a* and a pointer 25*b*. All the cells 25*a* are sequentially scanned at a predetermined constant rate by the pointer 25*b*, and the time that is spent in any one cell is called a time slot.

In FIG. 2, the cells 25*a* are arranged in thirty rows of forty cells per row, as an example. All of the FIG. 2 cells are scanned from left-to-right by the pointer 25*b*, one row at a time. FIG. 2 shows the pointer 25*b* at one particular time instant when it points to the third cell in the first row of the scheduler 25.

Each cell 25*a* stores either the identity of a particular viewer V(i) in the viewer set-up table 24, or an indicator that the cell is not used. For example, in FIG. 2 the left-most cell of each row identifies a viewer V1; the next cell in each row indicates that the cell is not used; the next cell in each row identifies a viewer V5; etc.

When the pointer 25*b* points to a cell which identifies a particular viewer V(i), the co-processor 20-1 uses the i-th row of the viewer set-up table 24 to a) partition one piece from the video data packets and their respective subgroup of internet protocol headers for that viewer, and b) send that partitioned piece with an additional ATM header to the internet protocol router 31. Conversely, when the pointer 25*b* points to a cell in the scheduler 25 which is not used, then the co-processor 20-1 simply waits for the pointer 25*b* to move to the next cell.

Figure 3:
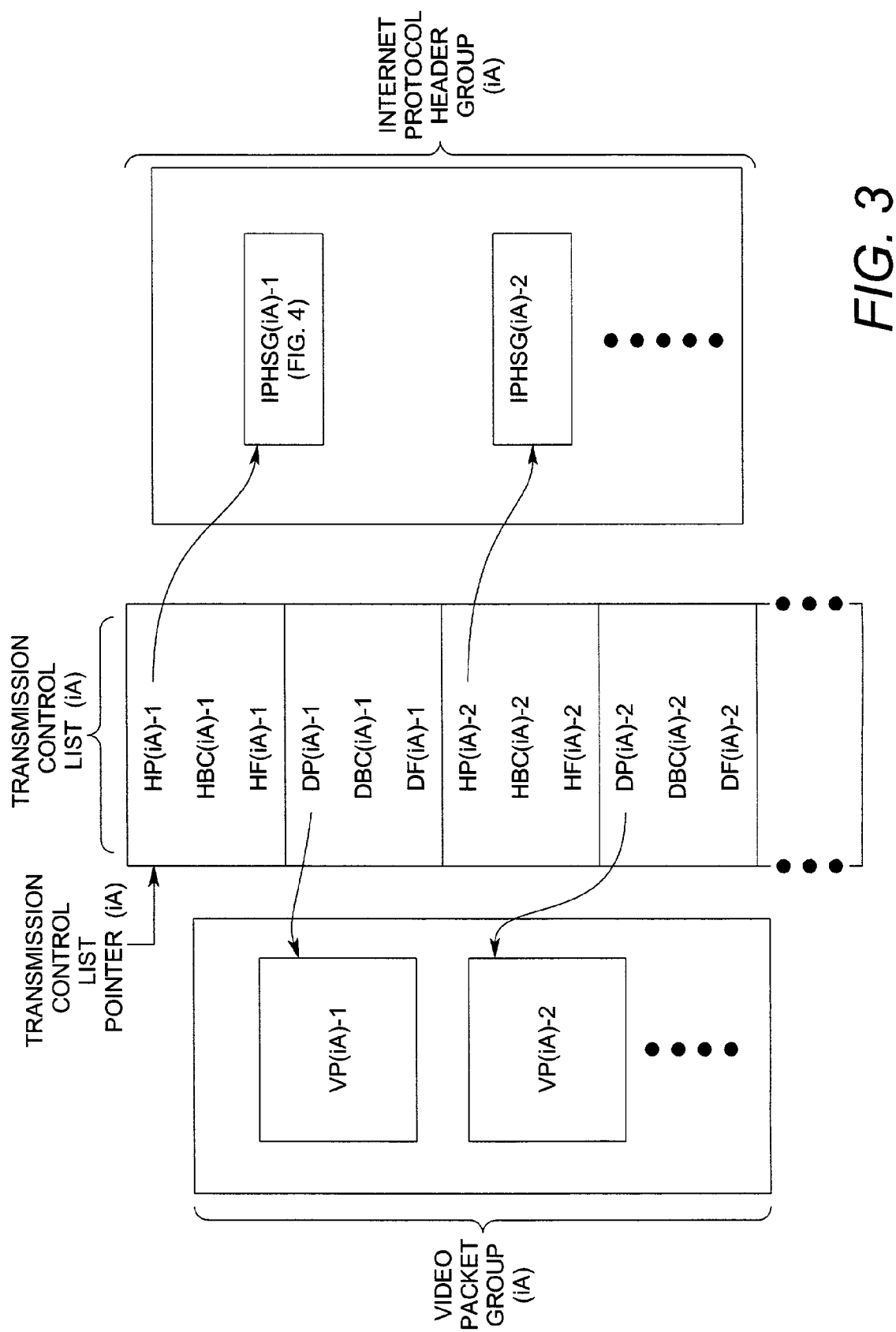
FIG. 3 shows additional details of a transmission control list, video data packets, and subgroups of internet protocol headers that are in the FIG. 1 video-on-demand system.

Next, with reference to FIG. 3, additional details on the internal structure of the transmission control list TCL(iA) will be described. In FIG. 3, the first entry in the list TCL(iA) consists of three header items HP(iA)-1, HBC(iA)-1, and HF(iA)-1; the second entry consists of three data items DP(iA)-1, DBC(iA)-1, and DF(iA)-1; etc.

Item HP(iA)-1 is a "header pointer" which points to the first subgroup of internet protocol headers IPHSG(iA)-1. Item HBC(iA)-1 is a "header byte count" which indicates the number of bytes that are in the first subgroup of internet protocol headers IPHSG(iA)-1. Item HF(iA)-1 in a set of "header flags" which indicate certain information about the first subgroup of internet protocol headers IPHSG(iA)-1.

Similarly, item DP(iA) is a "data pointer" which points to the first packet of video data VP(iA)-1. Item DBC(iA)-1 is a "data byte count" which indicates the number of bytes that in the first packet of video data VP(iA)-1. Item DF(iA)-1 is a set of "data flags" which indicate certain information about the first packet of video data VP(iA)-1.

Each of the entries in the transmission control list TCL (iA) are used by the co-processor 20-1 in a sequential fashion. Thus, the co-processor 20-1 first uses the items HP(iA)-1, HBC(iA)-1, and HF(iA)-1; next it uses the items DP(iA)-1, DBC(iA)-1, and DF(iA)-1; next it uses HP(iA)-2, HBC (iA)-2, and HF(iA)-2; etc. To sequentially address these entries, the co-processor 20-1 simply increments the transmission control list pointer TCLP (iA).

The internal structure of the transmission control list TCL(iB) is very similar to the structure that is shown in FIG. 3. In particular, to obtain the structure of the transmission control list TCL(iB), simply replace each occurrence of "(iA)" in FIG. 3 with "(iB)".

Figure 4:
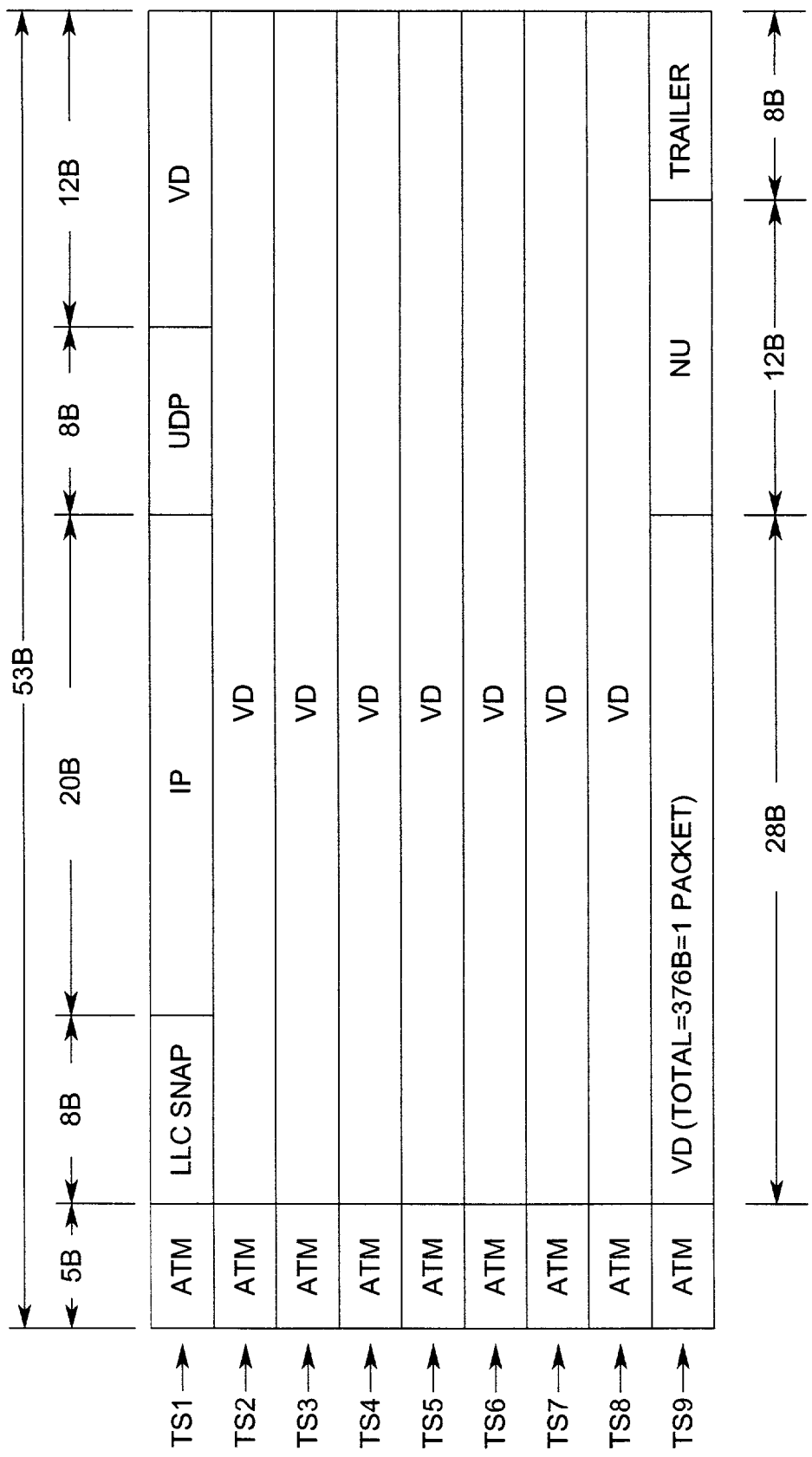
FIG. 4 shows the format in which the video data packets of FIG. 3 and one subgroup of internet protocol headers are sent by the co-processor of FIG. 1.

Referring now to FIG. 4, additional details will be described on how the co-processor 20-1a) partitions into pieces, each video data packet and its respective subgroup of internet protocol headers, and b) attaches an ATM header to each partitioned piece. In FIG. 4, the above partitioning and attaching occurs for a single video data packet, and its subgroup of internet protocol headers, during a series of nine spaced-apart time slots TS1-TS9.

Each partitioned piece in FIG. 4 is forty-eight bytes long. The first piece consists of one entire subgroup of internet protocol headers, that are called LLC SNAP, IP, and UDP; and twelve bytes of video data (VD) from one video data packet. The second piece thru the eighth piece each consist of forty-eight bytes of video data from the same video data packet. The ninth piece consists of twenty-eight bytes of video data from the same video data packet, plus twelve bytes that are not used, plus an eight byte trailer.

By adding the video data bytes in each piece in FIG. 4, it is seen that the single video data packet is three-hundred-seventy-six byes long. Also in FIG. 4, the ATM header which is attached to each partitioned piece is five bytes long.

Next, with reference to FIG. 5, the internal structure of the ATM header, the LLC SNAP header, the IP header, the UDP header, and the trailer will be described. Considering first the ATM header, if consists of a "virtual path indicator" (VPI), a "virtual channel identifier" (VCI), a "payload type indicator" (PTI), a "cell loss priority" (CLP), and a "cyclic redundancy check" (CRC). VPI is twelve bits long, and the VCI is twelve bits long. These are unique identifiers to subsequent ATM switches. A telephone number can be considered analogous to the VCI/VPI pair where the VPI is the area code and the VCI is the local exchange number. PTI is three bits long. The first bit is used to indicate a user data packet; the second bit is used to indicate congestion on the path; and the third bit is used to indicate the last cell of a frame (which contains the trailer). CLP is one bit long, and indicates the priority of the cell for discard during congestion. CRC is eight bits long, and provides protection across the five byte ATM header.

The LLC SNAP header consists of eight bytes which are all fixed. Each of those bytes is shown in FIG. 5 in a hexidecimal form.

The IP header consists of twenty bytes, six of which are fixed and twelve of which are variables. Variable L1 is the length in bytes of the entire IP datagram starting with the IP header and including the data payload. Variable PID is the Packet ID which is used to uniquely identify the IP datagram. This value must be unique for each datagram. Variable CS is the IP Header checksum, and it is calculated over the twenty byte IP Header. Variable SRC-IP-A is the IP address (a four byte value) identifying the source of the IP datagram. Variable DEST-IP-A is the destination IP address. This value identifies the destination of the datagram and is used by IP routers to determine the correct path to the destination.

The UDP header consists of eight bytes, two of which are fixed and six of which are variables. Variable SRC-P is the source port number, and it is used to send any response data. Variable DEST-P is the destination port number, and it is used to deliver data to the correct UDP application at the destination IP address. Variable L2 is the length of the UDP data and header.

The trailer consists of eight bytes which are all variables. Variable CPCS is the Common Part Convergence Sub-layer user data and is currently unused (set to 0). Variable CPI is the Common Part Indicator and is currently unused (set to 0). Variable L3 is the length in bytes of the datagram including the LLC, IP, and UDP headers, and the data. Variable CRC is the Cyclical Redundancy Checksum and is computed over the length (Variable L3) of the datagram.

Figure 6:
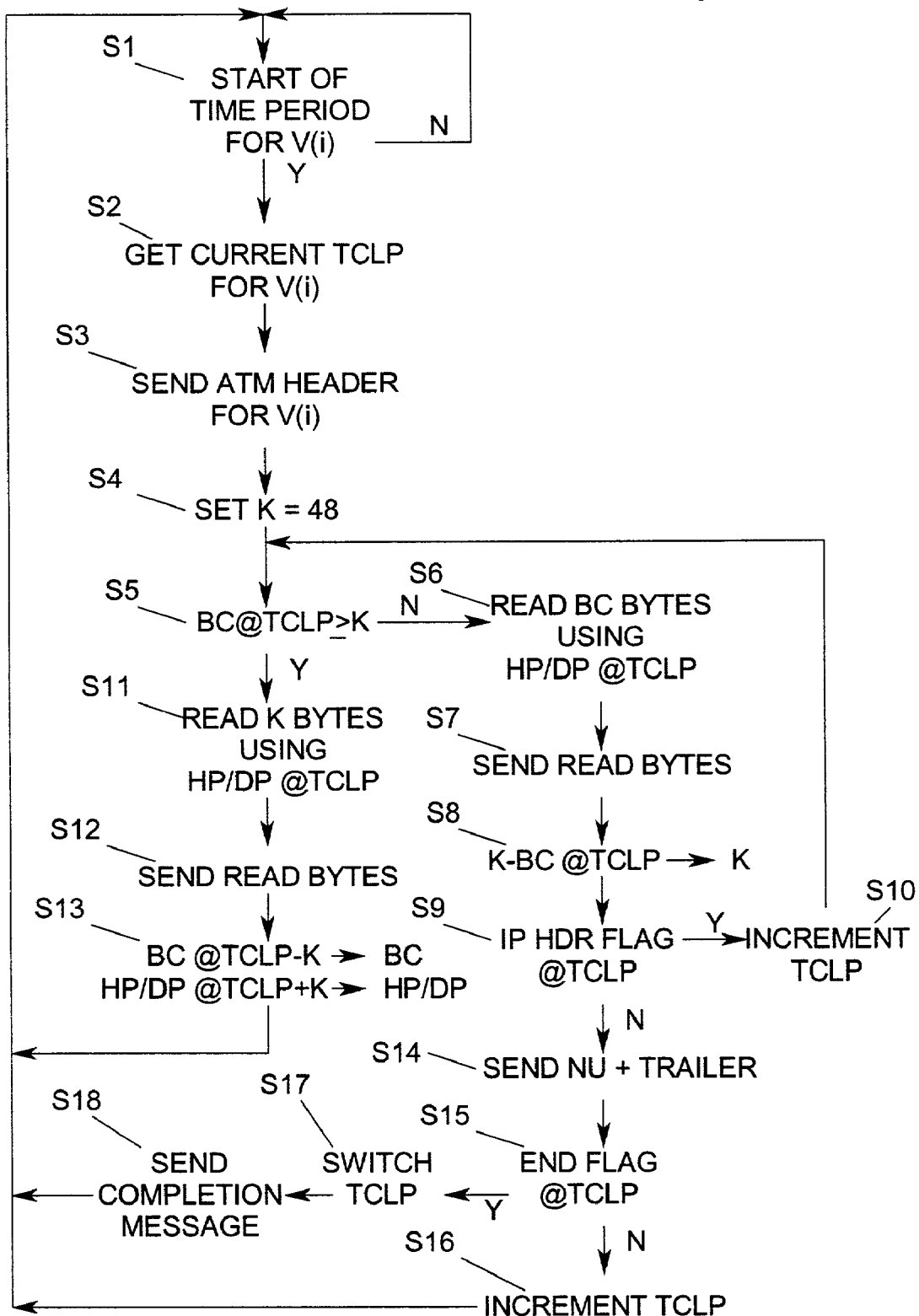
FIG. 6 shows the details of a control program for the co-processor that is in the video-on-demand system of FIG. 1.

Turning now to FIG. 6, the internal structure of the control program 22 for the co-processor 20-1 will be described. This control program 22 consists of a plurality of computer instructions which direct the co-processor 20-1 to perform the steps S1-S18 that are shown in FIG. 6.

In step S1, the co-processor 20-1 waits for the start of a new time period for a viewer V(i). This occurs when the pointer 25b in the scheduler 25 moves from one call 25a to another call that stores the identify of the viewer V(i). If the pointer 25b moves to a cell that is not used, then the co-processor 20-1 simply continues to wait in step S1.

When the new time period for viewer V(i) begins, the co-processor 20-1 first performs step S2. There, the co-processor 20-1 reads the current transmission control list pointer TCLP (iA) or TCLP (iB) from the i-th row of the viewer set-up table 24.

Next, the co-processor 20-1 performs step S3. There, the co-processor 20-1 reads the asynchronous transfer mode header ATMH(i) from the i-th row of the viewer set-up table 24 and sends that header to the ATM interface 30.

Next, the co-processor 20-1 performs step S4. There, the co-processor 20-1 sets a count "K" within the co-processor to the number of bytes per piece into which each video data packet and its respective subgroup of internet protocol headers are to be partitioned. In the previously described FIG. 4, the number of bytes per piece into which video data packet and its respective subgroup of internet protocol headers were partitioned was forty-eight. That is achieved by setting K equal to forty-eight in step S4 of FIG. 6.

Next, the co-processor 20-1 performs step S5. In that step, the co-processor 20-1 compares K to a byte count BC. Here, BC is the header byte count HBC, or the data byte count DBC, that is pointed to by the current transmission control list pointer TCLP (iA) or TCLP(iB). If the byte count BC is larger or equal to K, then step S11 is performed; otherwise, step S6 is performed.

Suppose now that the current transmission control list pointer points to a header byte count HBC, in the transmission control list. In that case, the header byte count HBC will equal thirty-six bytes, as can be seen from FIGS. 4 and 5; and thus step S6 will be performed after step S5.

In step S6, the co-processor 20-1 reads a total of BC bytes, from the supervisor memory 12, that are addressed by the pointers HP or DP. HP is a header pointer, and DP is a data pointer, that is pointed to by the current transmission control list pointer TCLP(iA) or TCLP(iB).

Next, in step S7, the co-processor 20-1 sends all of the bytes that it read in step S6 to the ATM interface 30. Then, in step S8, the co-processor 20-1 subtracts the byte count BC from the internal count K. The result of this subtraction becomes the new internal count K.

Next, in step S9, the co-processor 20-1 tests a flag that is pointed to by the current transmission control list pointer TCLP(iA) or TCLP(iA). This flag is in each set of the header flags HF and the data flags DF in the transmission control list. If the tested flag indicates that the current transmission control list pointer is pointing to three header items, then a branch is taken to step S10. Otherwise, a branch is taken to step S14.

Assume now that the branch is taken to step S10. There, the current transmission control list pointer TCLP(iA) or TCLP(iB) is incremented such that it points to the next three items in the transmission control list. These three items will be a data pointer DP, a data byte count DBC, and a set of data flags DF.

After step S10 is performed, a branch is taken back to step S5. There, the co-processor 20-1 compares K to the byte count BC. Initially, the byte count BC within any three data items will be set to three-hundred-seventy-six, as was previously described in conjunction with FIG. 4. Thus, since the byte count BC is larger than K, a branch is taken to step S11.

In step S11, the co-processor 20-1 reads a total of K bytes, from the supervisor memory 12, that are addressed by the pointer DP. Here, DP is the data pointer that is pointed to by the current transmission control list pointer TCLP(iA) or TCLP(iB).

Next, in step S12, the co-processor 20-1 sends all of the bytes that it reads in step S11 to the ATM interface 30. Then, in step S13, the co-processor 20-1 subtracts K from the byte count BC, and adds K to the data pointer DP. The byte count BC and data pointer DP as modified, are stored back into the portion of the transmission control list that is pointed to by the current transmission control list pointer TCLP(iA) or TCLP(iB). Then a branch is taken back to step S1.

Suppose now that back in step S9, the tested flag indicates that the current transmissions control list pointer is pointing to three data items. Then, a branch is taken to step 14.

In step S14, the co-processor 20-1 sends the "not used" bytes and the "trailer" bytes that occur in FIG. 4 during the time slot TS9. Then, in step S15, the co-processor 20-1 tests a flag that is pointed to by the current transmission control list pointer TCLP(iA) or TCLP(iB). This flag is in each set of the data flags DF in the transmission control list, and it identifies the last video data packet in a video packet group.

If the video data packet that is pointed to by the current transmission control list pointer is not the last packet of a group, then a branch is taken to step S16. There, the co-processor 20-1 increments the current transmission control list pointer such that it points to the next three header items HP, HBC, and HF in the transmission control list. Then a branch is taken back to step S1.

Conversely, if the video data packet that is pointed to by the current transmission control list pointer is the last packet of a group, then a branch is taken to step S17. There, the co-processor 20-1 switches the current transmission control list pointer from TCLP(iA) to TCLP(iB), or vice-versa. Then, in step S18, the co-processor 20-1 sends a "completion message" to the supervisor processor 10 and branches back to step S1.

How the above steps of FIG. 6 apply to the time slots TS1-TS9 of FIG. 4 is as follows. During time slot TS1, the co-processor 20-1 perform steps S1, S2, S3, S4, S5, S6, S7, S8, S9, S10, 5, S1, S12, and S13. During each of the time slots TS2-TS8, the co-processor 20-1 performs steps S1, S2, S3, S4, S5, S11, S12, and S13. And, during time slot TS9, the co-processor 20-1 performs steps S1, S2, S3, S4, 5, S6, S7, S8, S9, S14 and S15. Following step 15, either step S16, or steps S17 and S18 are performed.

Figure 7:
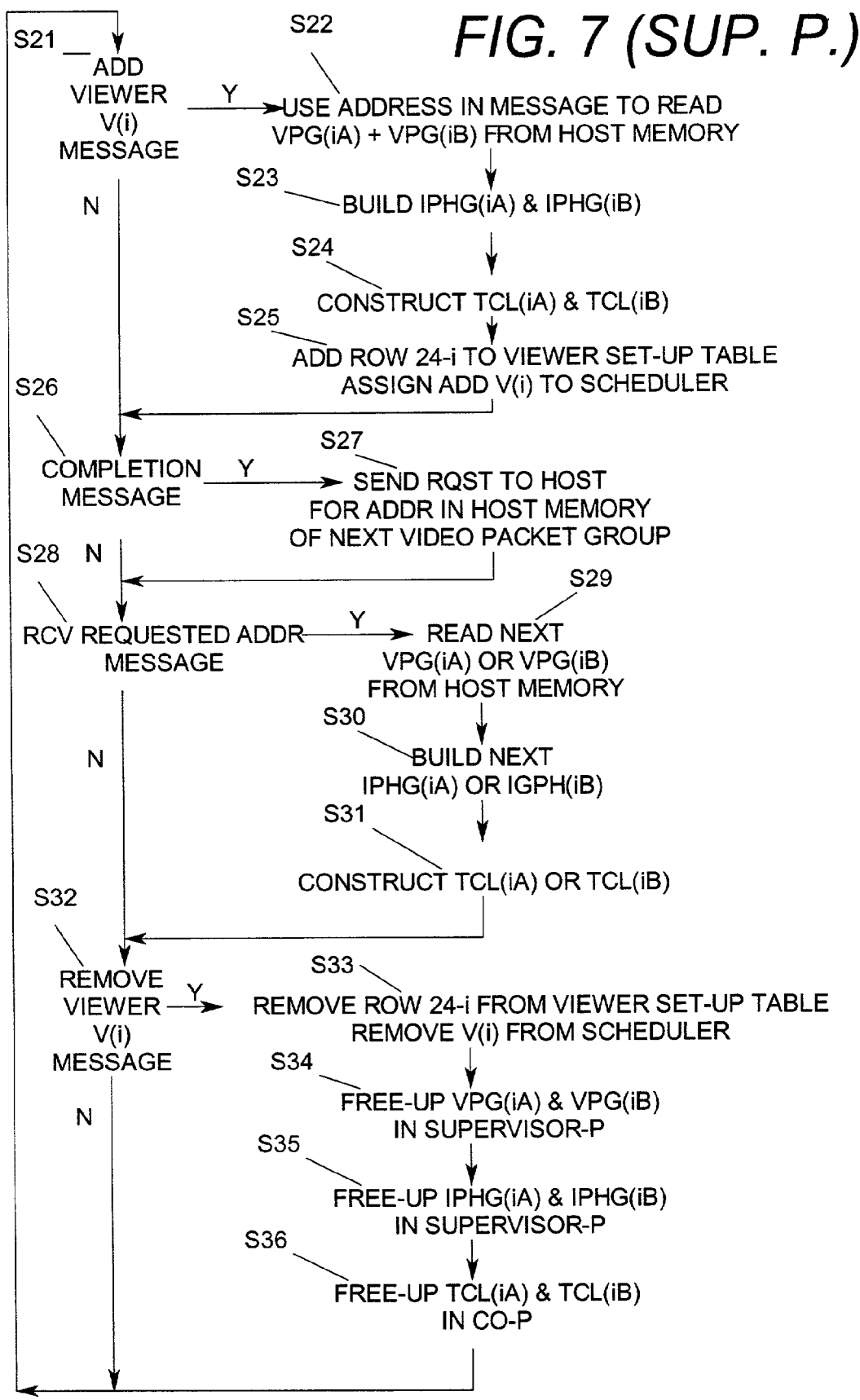
FIG. 7 shows the details of a control program for a supervisor processor that is in the video-in-demand system of FIG. 1.

Referring next to FIG. 7, the internal structure of the control program 13 for the supervisor processor 10 will be described. This control program 13 consists of a plurality of computer instructions which direct the supervisor processor to perform the steps S21-S36 that are shown in FIG. 7.

In step S21, the supervisor processor 10 examines the queue 16 to see if the queue holds an "add viewer V(i) message" from the host processor 1. If such a message is present in the queue 16, then the supervisor processor 10 performs steps S22-S25. Otherwise, a branch is taken to step S26.

Assume now that a message to add viewer V(i) is in the queue 16. That message includes the beginning address of the video packet group VPG(iA) in the host memory 3, and the beginning address of the video packet group VPG(iB) in the host memory 3. Those two addresses are used by supervisor processor 10 in step S22 to transfer the video packet groups VPG(iA) and VPG(iB) from the host memory 3 into item 14 in the supervisor memory 12.

Next, in step S23, the supervisor processor 10 builds the group of internet protocol headers IPHG(iA) for the video packet group VPG(iA); and it builds the group of internet protocol headers IPHG(iB) for the video packet group VPG(iB). These two groups of internet protocol headers IPHG(iA) and IPHG(iB) are stored into item 15 in the supervisor memory 12.

Next, in step S24, the supervisor processor 10 constructs the transmission control list TCL(iA) for the group of internet protocol headers IPHG(iA) and the video packet group VPG(iA); and it constructs the transmission control list TCL(iB) for the group of internet protocol headers IPHG(iB) and the video packet group VPG(iB). These two transmission control lists are stored by the supervisor processor 10 into item 23 in the co-processor memory 21.

Next, in step S25, the supervisor processor 10 adds one row 24-1 to the viewer set-up table 24; and it assigns particular cells 25a in the scheduler 25 to the viewer v(i). Thereafter, each time the pointer 25b in the scheduler 25 moves to one of the above assigned cells, the co-processor 20-1 performs the previously described steps of FIG. 6 for the viewer V(i).

Following step S25 in FIG. 7, the supervisor processor 10 branches to step S26. There, the supervisor processor 10 examines the queue 16 to see if the queue holds a "completion message" from the co-processor 20-1. If such a message is present, then the supervisor processor 10 performs step S27; otherwise a branch is taken to step S28.

Recall from FIG. 6, that the completion message is sent by the co-processor 20-1 when all of the video data packets of one group have been sent to the ATM interface 30. This occurs in FIG. 6 in step S18. In response to the completion message, the supervisor processor 10 sends a request to the host processor 1 for the starting address of the next video packet group in the host memory 3. This request is sent in step S27.

Following step S27 in FIG. 7, the supervisor processor 10 branches to step S28. There, the supervisor processor 10 examines the queue 16 to see if the queue holds a "received requested address message" from the host processor 1. This message is sent by the host processor 1 in response to the request that is sent by the supervisor processor 10 in step S27. If the "received requested address message" is present in the queue 16, then the supervisor processor 10 performs steps S29-S31; otherwise a branch is taken to step S32.

Included in the "received requested address message" in the starting address in the host memory 3, of the next group of video data packets for the viewer V(i). That address is used by the supervisor processor 10, in step S29, to transfer the next group of video data packets VPG(iA) or VPG(iB) from a video in the host memory 3 into item 14 in the supervisor memory 12.

Next, in step S30, the supervisor processor 10 builds a respective group of internet protocol headers for the group of video data packets that was transferred in step S28. This group, an internet protocol header IPHG(iA) or IPHG(iB) is stored into item 15 of the supervisor memory 12.

Next, in step S31, the supervisor processor 10 constructs a transmission control list for the group of video data packets that was transferred in step S29 and the group of internet protocol headers that was built in step S30. This transmission control list TCL(iA) or TCL (iB) is stored into item 23 of the co-processor memory 21.

Following step S31, the supervisor processor 10 branches to step S32. Then, the supervisor processor 10 examines the queue 16 to see if the queue holds a "remove viewer V(i) message" from the host processor 1. If such a message is present in the queue 16, then the supervisor processor 10 performs steps S33-S36. Otherwise, a branch is taken back to step S21.

Assume now that a message to remove viewer V(i) is in the queue 16. Then, in step S33, the supervisor processor 10 deletes row 24-*i* from the viewer set-up table 24, and it removes viewer V(i) from the cells 25a in the scheduler 25.

Next, in step S34, the supervisor processor 10 marks as unused, the portion of item 14 in the supervisor memory 12 which stores the video packet groups VPG(iA) and VPG(iB) for the viewer V(i). That portion of item 14 then becomes available to store two video packet groups for another viewer.

Next, in step S35, the supervisor processor 10 marks as unused, the portion of item 15 in the supervisor memory 12 which stores the internet protocol header groups IPHG(iA) and IPHG(iB) for the viewer V(i). That portion of item 15 then becomes available to store two internet protocol header groups for another viewer.

Lastly, in step S36, the supervisor processor 10 marks as unused, the portion of item 23 in the co-processor memory 21 which stores the transmission control lists TCL(iA) and TCL(iB). That portion of item 23 then becomes available to store two transmission control lists for another viewer. Then, from step S36, a branch is taken back to step S21.

Figure 8:
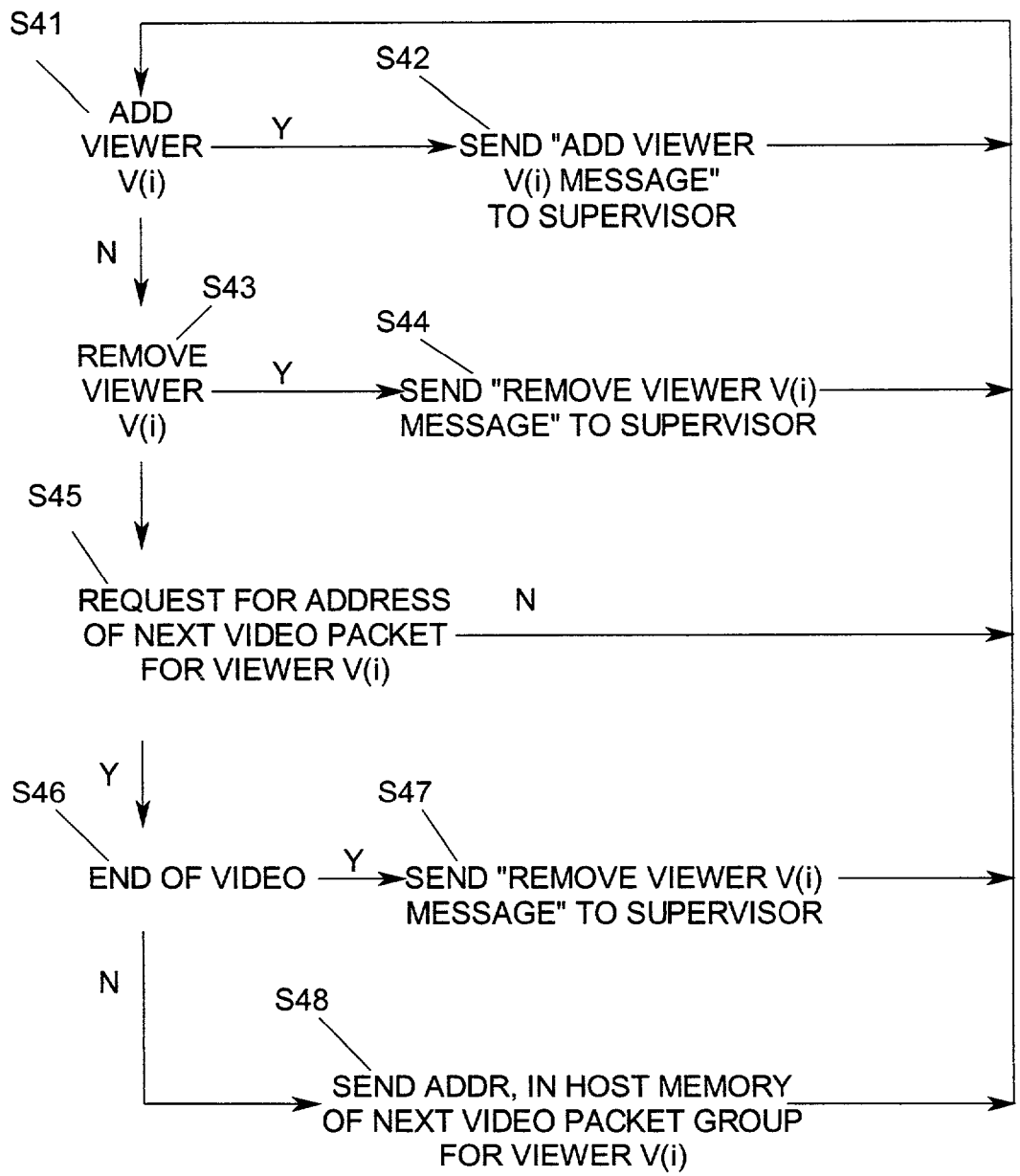
FIG. 8 shows the details of a control program for a host processor that is in the video-on-demand system of FIG. 1.

Next with reference to FIG. 8, the internal structure of the control program 4 for the host processor 1 will be described. This control program 4 consists of a plurality of computer instructions which direct the host processor 1 to perform steps S41-S48 that are shown in FIG. 8.

In step S41, the host processor 1 examines the queue 6 to see if the queue holds a request from a viewer V(i) to start sending one of the videos 5A, 5B, etc. to one particular set-top box 34(*i*). If such a request is present in the queue 6, then the host processor 1 performs step S42. Otherwise, a branch is taken to step S43.

In step S42, the host processor 1 sends an "add viewer V(i) message" to the queue 16 for the supervisor processor 10. This message includes all of the information which the supervisor processor 10 will need to perform the previously described steps S22-S25 of FIG. 6. Then, a branch is taken back to step S41.

In step S43, the host processor 1 examines the queue 6 to see if the queue holds a request from a viewer V(i) to stop sending one of the videos 5A, 5B, etc. to one particular set-top box 34(*i*). If such a request is present in the queue 6, then the host processor 1 performs step S44. Otherwise, a branch is taken to step S45.

In step S44, the host processor 1 sends a "remove viewer V(i) message" to the queue 16 for the supervisor processor 10. This message includes all of the information which the supervisor processor 10 will need to perform the previously described steps S33-S38 of FIG. 7. Then, a branch is taken back to step S41.

In step S45, the host processor 1 examines the queue 6 to see if the queue holds a request, from the supervisor processor 10, for the address in the host memory 3 of the next group of video packets for viewer V(i). If such a request is present in the queue 6, the host processor 1 performs step S46; otherwise a branch is taken back to step S41.

In step S46, the host processor 1 checks to see if the video that is being sent to the viewer V(i) has reached its end. If the entire video has not been sent to the viewer V(i), then the host processor 1 performs step S48 wherein it sends a "received requested address message" to the queue 16 for the supervisor processor 10. That message includes the starting address, in the host memory 3, of the next group of video data packets for the viewer V(i). Then a branch is taken back to step S41.

Conversely, if the entire video has been sent to the viewer V(i), then the host processor 1 performs step S47. There, the host processor 1 sends the "remove viewer V(i) message" to the queue 16 for the supervisor processor 10. Then, a branch is taken back to step S41.

One preferred embodiment of the present invention has now been described in detail. In addition, however, various changes and modifications can be made to the details of this particular embodiment without departing from the essential features of the invention.

Figure 9:
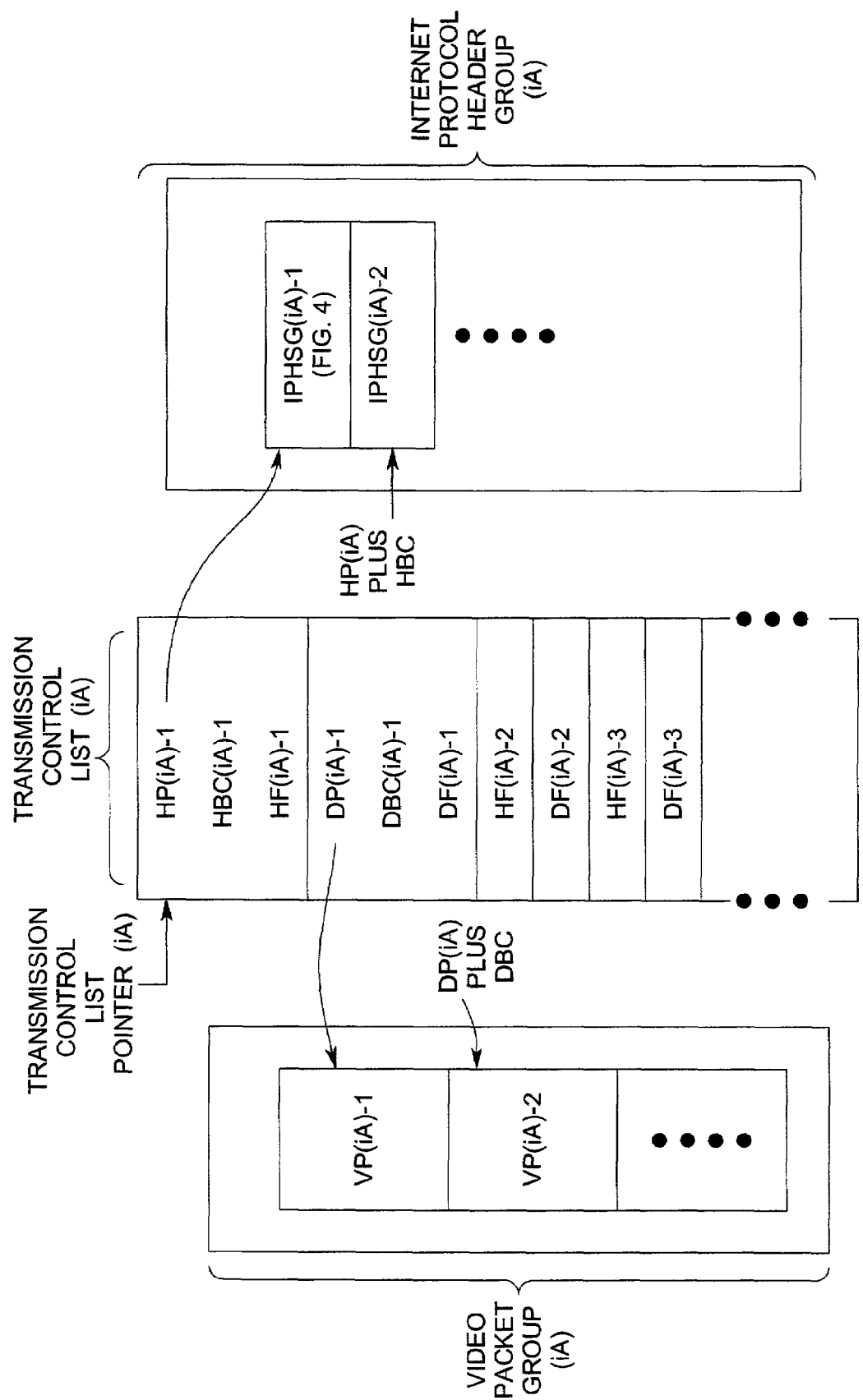
FIG. 9 shows an alternative embodiment for the transmission control list of FIG. 3.

For example, as one such modification, the structure of the video packet groups, the internet protocol header groups, and the transmission control lists can be changed from the structure that is shown in FIG. 3 to the structure that is shown in FIG. 9. In FIG. 9, each of the video data packets VP(iA)-1, VP(iA)-2, etc. in the group VPG(iA) contain the same number of bytes, and they are stored in consecutive order in item 14 of the memory 12. Likewise, in FIG. 9, each of the subgroups of internet protocol headers IPHSG(iA)-1, IPHSG(iB)-2, etc. in the group IPHG(iA) contain the same number of bytes, and they are stored in consecutive order in item 15 of the memory 12.

Due to the FIG. 9 structure of video packet group VPG(iA) and internet protocol header group IPHG(iA), the structure of the corresponding transmission control list TCL(iA) is simplified. In FIG. 9, the first entry in the list TCL(iA) consists of the same three header items HP(iA)-1, HBC(iA)-1, and HF(iA)-1 that occur in FIG. 3; and, the second entry in the list TCL(iA) consists of the same three header items DP(iA)-1, DBC(iA)-1, and DF(iA)-1 that occur in FIG. 3. But then, each entry in the list TCL(iA) after the second entry consists of only the flags that occur in FIG. 3.

In FIG. 9, the header pointer HP(iA)-1 initially contains the starting address of the first subgroup of internet protocol headers IPHSG(iA)-1. Then, after that starting address is incremented by the header byte count HBC(iA)-1, the header pointer HP(iA)-1 contains the starting address of the second subgroup of internet protocol headers IPHSG(iA)-2.

Similarly in FIG. 9, the data pointer DP(iA)-1 initially contains the starting address of the first packet of video data VP(iA)-1. Then, after that starting address is incremented by the data byte count DBC(iA)-1, the data printer DP(iA)-1 contains the starting address of the second packet of video data VP(iA)-2.

As another modification, the videos in the FIG. 1 system, which are stored as items 5A, 5B, etc., in the host memory 3, can instead be removed from the memory 3 and stored on any other type of storage media that is readable by the host processor 1. For example, those videos can be stored on an optical disk, or a magnetic disk, or an integrated circuit memory that is separate from the host memory 3.

Similarly, the control programs 4, 13, and 22 which are stored in the FIG. 1 system in the memories 3, 12 and 21 respectively, can be removed from those memories and stored for sale to customers on any other storage media that is readable by a computer. Here again, the storage media can be an optical disk, or a magnetic disk, or an integrated circuit memory that is separate from the memories 3, 12, and 21.

As another modification, the host processor 1 in the FIG. 1 system can be eliminated, and the steps which the host processor 1 performs can instead be performed by the supervisor processor 10. With this modification, the steps of FIG. 7 and FIG. 8 would be performed by the supervisor processor 10.

Figure 5:
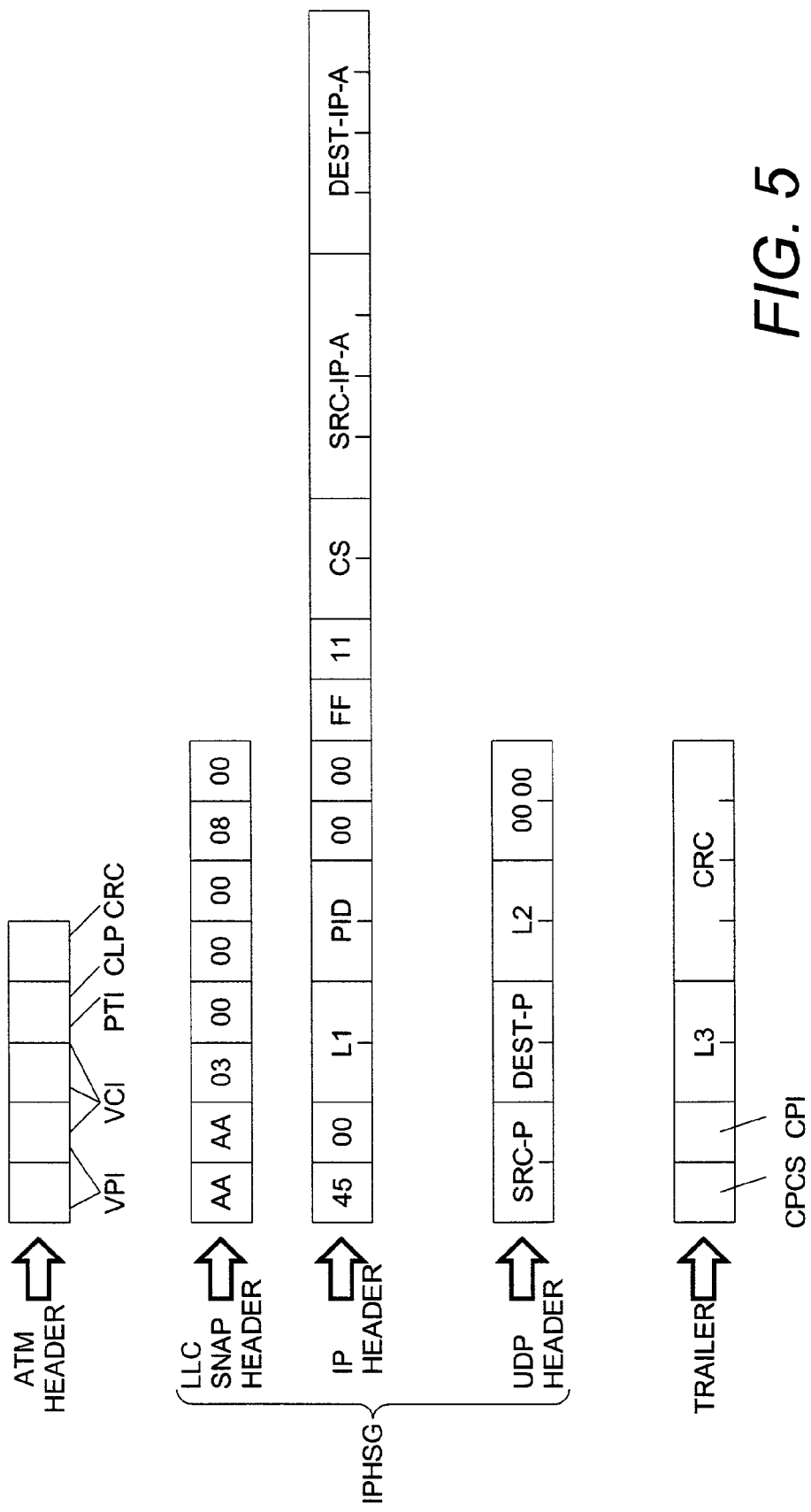
FIG. 5 shows the complete internal make-up of one subgroup of internet protocol headers in FIG. 4.
Figure 10:
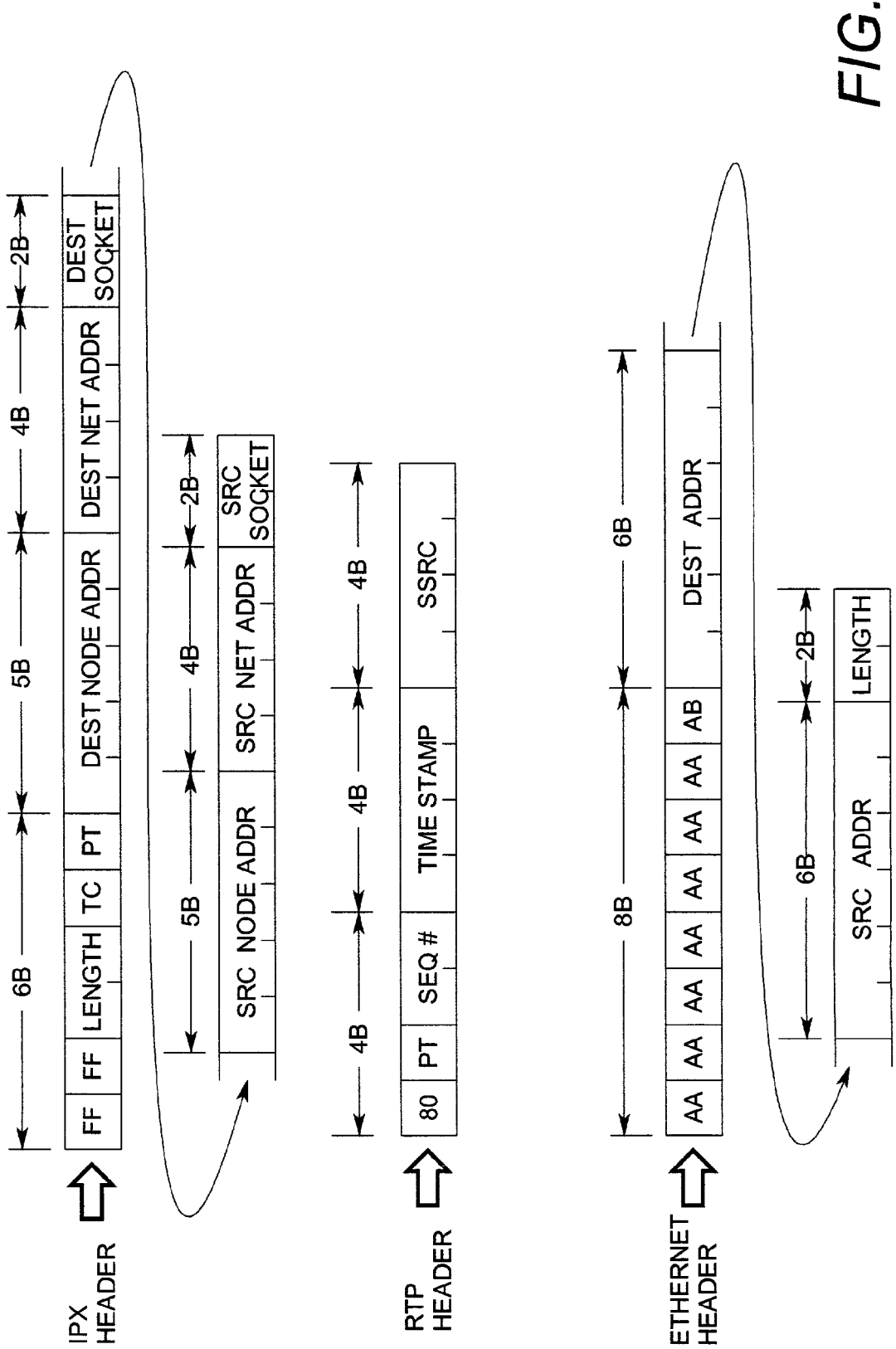
FIG. 10 shows three alternative embodiments for the headers in FIGS. 4 and 5.

As another modification, any of the various items which are in the headers and trailer that are shown in FIGS. 4 and 5, can be changed. One specific example is that the last two bytes of the LLC SNAP header can be changed from "0800" as shown in FIG. 5 to "8137"; and when that change is made, the IP header and UDP header of FIGS. 4 and 15 need to be replaced with another header that is called the IPX header. The internal structure of this IPX header is shown in FIG. 10.

Another specific example is that immediately after the UDP header in FIGS. 4 and 5, an additional header, called the RTP header, can be inserted. The internal structure of this RTP header is also shown in FIG. 10.

As another modification, the co-processor control program 22 in FIGS. 1 and 6 can partition each video data packet and its respective subgroup of internet protocol headers, into any number of bytes K, as desired. FIG. 4 illustrates just one example of where K equals forty-eight bytes. As K decreases, the number of time-slots that is needed to send a single video data packet, and its respective subgroup of internet protocol headers increases; and vice-versa. For example, if K is set equal to thirty-six plus three-hundred-seventy-six, then one entire video data packet from FIG. 4 and its respective subgroup of internet protocol headers from FIG. 4 can be sent, together with a single additional header, in a single time slot. Such a large partitioned piece is not permitted by the ATM transmission standards; but, it is allowed by the transmission standards for other types of networks. For example, if the ATM header in the first time slot TS1 of FIG. 4 is replaced with the ethernet header as shown in FIG. 10, then the thirty-six byte internet protocol headers of FIG. 4 and the three-hundred-seventy-six byte video data packet of FIG. 4 can be sent by the co-processor 20-1 in a single time slot.

Accordingly, it is to be understood that the scope of the present invention is not limited to just the details of the described preferred embodiment, but is defined by the appended claims.

What is claimed is:

1. A control program for a computer in a video-on-demand system, which is embodied in a program storage device that is readable by said computer and which directs said computer to perform the steps of:
   transfer a group of video data packets, from a complete video in a first memory into a second memory for said computer;
   build, in said second memory, a respective subgroup of internet protocol headers for each video data packet in said group; and,
   construct, in said second memory, a transmission control list which indicates how each video data packet in said group and its respective subgroup of internet protocol headers, can be accessed from said second memory by another computer.

2. A control program according to claim 1 wherein said build step includes the substep of—providing multiple variables, in each respective subgroup of internet protocol headers, that change with each subgroup.

3. A control program according to claim 1 wherein said build step includes the substep of—providing a variable in each respective subgroup of internet protocol headers, that changes as a function of each video data packet.

4. A control program according to claim 1 wherein said construct step includes the substep of—providing in said list, a respective pointer and a respective byte count and a respective set of flags for each video data packet in said group and for each subgroup of internet protocol headers.

5. A control program according to claim 1 wherein said construct step includes the subatep of—providing in said list, just one pointer for every video data packet in said group, and just one other pointer for every subgroup of internet protocol headers, and a respective set of flags for each video data packet in said group and for each subgroup of internet protocol headers.

6. A control program according to claim 1 which also directs said computer to perform the steps of—a) receive a series of requests from an external computer, and b) repeat, in response to each of said requests, said transfer step and said build step and said construct step.

7. A control program according to claim 1 wherein each subgroup of internet protocol headers that is built by said build stop includes at least two separately identifiable headers.

8. A control program according to claim 1 wherein said transfer step transfers from forty to four hundred video data packets in each group.

9. A control program according to claim 1 wherein said program storage device is an optical storage media.

10. A control program according to claim 1 wherein said program storage device is a magnetic storage media.

11. A control program according to claim 1 wherein said program storage device is an integrated circuit.

\* \* \* \* \*

UNITED STATES PATENT AND TRADEMARK OFFICE
CERTIFICATE OF CORRECTION

PATENT NO. : 7,299,486 B1 Page 1 of 1
APPLICATION NO. : 10/010899
DATED : November 20, 2007
INVENTOR(S) : Kent M. Campbel et al.

It is certified that error appears in the above-identified patent and that said Letters Patent is hereby corrected as shown below:

In Claim 5, Column 14, line 41: "subatep" should be --substep--

In Claim 7, Column 14, line 54: "stop" should be --step--

Signed and Sealed this

Tenth Day of June, 2008

JON W. DUDAS
*Director of the United States Patent and Trademark Office*